US00RE39528E

(19) United States
(12) Reissued Patent
Kanehisa et al.

(10) Patent Number: US RE39,528 E
(45) Date of Reissued Patent: Mar. 27, 2007

(54) BICYCLE HUB WITH SPACER AND DETACHABLE FREEWHEEL

(75) Inventors: Takanori Kanehisa, Osaka (JP); Masahiro Yamanaka, Osaka (JP)

(73) Assignee: Shimano Inc., Osaka (JP)

(21) Appl. No.: 10/922,150

(22) Filed: Aug. 20, 2004

Related U.S. Patent Documents

Reissue of:
(64) Patent No.: 6,409,281
Issued: Jun. 25, 2002
Appl. No.: 09/728,086
Filed: Dec. 4, 2000

(51) Int. Cl.
*B60B 27/00* (2006.01)

(52) U.S. Cl. ..... 301/110.5; 301/124.2; 301/110.06; 280/288

(58) Field of Classification Search ..... 301/110.5, 301/124.2, 110.6; 280/288; 188/24.11, 26; 403/320, 322.4, 374.5; 224/315, 324, 924
See application file for complete search history.

(56) References Cited

U.S. PATENT DOCUMENTS

| | | | | | |
|---|---|---|---|---|---|
| 3,807,761 | A | * | 4/1974 | Brilando et al. | 280/279 |
| 4,805,941 | A | * | 2/1989 | Downing et al. | 280/279 |
| 5,058,913 | A | * | 10/1991 | La Riviere et al. | 280/281.1 |
| 5,215,324 | A | * | 6/1993 | Kawai | 301/124.2 |
| 5,383,716 | A | * | 1/1995 | Stewart et al. | 301/124.2 |
| 5,531,510 | A | * | 7/1996 | Yamane | 301/110.5 |
| 5,653,512 | A | * | 8/1997 | Phillips | 301/124.2 |
| 5,823,555 | A | * | 10/1998 | Ashman | 301/124.2 |
| 5,984,423 | A | * | 11/1999 | Becker | 301/110.5 |
| 6,290,304 | B1 | * | 6/2001 | Lashinske | 301/110.5 |
| 6,352,314 | B1 | * | 3/2002 | Tabe | 301/110.5 |
| 6,761,417 | B2 | * | 7/2004 | Denby | 301/124.2 |
| 6,964,425 | B2 | * | 11/2005 | Turner | 280/276 |

FOREIGN PATENT DOCUMENTS

| | | | | |
|---|---|---|---|---|
| DE | 1155355 | * | 4/1964 | |
| DE | 9218358 | * | 3/1994 | |
| EP | 94649 | * | 11/1983 | |
| EP | 890505 | * | 1/1999 | |
| EP | 835188 | * | 9/1999 | |
| FR | 961345 A | * | 5/1950 | |
| FR | 1093378 | * | 5/1955 | |
| FR | 2188551 | * | 1/1974 | |
| FR | 2501124 | * | 9/1982 | |
| FR | 002518461 | * | 6/1983 | 301/110.5 |
| FR | 2776612 | * | 10/1999 | |
| GB | 09170 A | | of 1912 | |
| GB | 572237 | * | 9/1945 | |
| GB | 668943 | * | 3/1952 | |
| IT | 596057 | * | 7/1959 | |

(Continued)

*Primary Examiner*—Frantz F. Jules
(74) *Attorney, Agent, or Firm*—Global IP Counselors, LLP

(57) ABSTRACT

A bicycle hub is provided that includes a hub axle, a hub body, a sprocket support member and a spacer. The spacer is movable to allow the hub body to be axially separated from the freewheel without removing the freewheel from the rear fork of the bicycle. The hub axle has a first portion and a second portion releasably coupled to the first portion. The hub body has an outer tubular portion and an interior passageway with the first portion of the hub axle rotatably supported therein. The sprocket support member has a portion releasably and non-rotatably coupled to the outer tubular portion of the hub body. The sprocket support member is mounted on the second portion of the hub axle. The spacer is supported on the first portion of the hub axle adjacent a free end of the hub body. The spacer has a spacing portion and is configured to move in a transverse direction relative to the hub axle between a first position and a second position without removing the first portion of the hub axle from the hub body. In the first position, the spacing portion is located adjacent the hub axle. In the second position, the spacing portion is spaced from the hub axle.

29 Claims, 10 Drawing Sheets

FOREIGN PATENT DOCUMENTS

| | | | | |
|---|---|---|---|---|
| JP | 5551601 | * | 4/1980 | |
| JP | 62-98822 | U | 6/1987 | |
| JP | 63-49012 | U | 4/1988 | |
| JP | 1-172990 | U | 12/1989 | |
| NL | 504668 | | 8/1930 | |
| WO | WO 089004258 | * | 5/1989 | ..... 301/110.5 |
| WO | WO 091005694 | * | 5/1991 | ..... 301/110.5 |

* cited by examiner

BICYCLE HUB WITH SPACER AND DETACHABLE FREEWHEEL

Matter enclosed in heavy brackets [ ] appears in the original patent but forms no part of this reissue specification; matter printed in italics indicates the additions made by reissue.

BACKGROUND OF THE INVENTION

1. Field of the Invention

This invention generally relates to a bicycle hub with a detachable freewheel. More specifically, the present invention relates to a bicycle hub with a spacer provided on a two-part axle to allow separation of a sprocket support member from the hub without removing the freewheel from the bicycle frame.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving the components of the bicycle. One particular component of the bicycle, which has been extensively redesigned over the past years, is the rear bicycle hub.

Specifically, most bicycles have several speeds. Accordingly, the rear bicycle hub usually includes a freewheel. The freewheel includes at least one chain engaging sprocket. One popular form of drive train and freewheel for a bicycle includes a plurality of sprockets that are mounted on the hub of the rear bicycle wheel. During pedaling, the bicycle chain engages one of the rear sprockets to rotate the rear wheel. When bicycle rider stops pedaling, the rear wheel should be able to continue to rotate while the sprockets remain stationary. Accordingly, the rear hub is usually provided with a freewheel that has a one-way clutch.

Freewheels are used to transmit a driving force to the rear bicycle wheel in one rotation direction only. These freewheels are usually mounted on the rear hub of a bicycle. Freewheels typically allow the bicycle to advance freely without any rotation of the pedals. Freewheels usually include boss type freewheels which are mounted on the boss of the rear hub by being screwed onto the rear hub, and free hub type freewheels which are fastened to the rear hub as integral parts of the rear hub. Both types of freewheels are equipped with an outer tubular part, an inner tubular part which is installed radially inwardly of the outer tubular part so that the inner tubular part is free to rotate relative to the outer cylinder part. A one-way clutch is installed between the outer tubular part and inner tubular part for transmitting the driving force from the outer tubular part to the inner tubular part in one rotational direction only. The outer tubular part usually has a plurality of gears mounted thereon, while the inner tubular part is usually mounted on the rear hub of the bicycle.

Splines are formed between the sprocket wheels and boss to prohibit relative rotation therebetween positively. Since this unit is used for the rear wheel of a bicycle, drive must be transmitted between the rear wheel axle and boss through a one-way mechanism. For this purpose, the boss is formed as an outer race of a one-way clutch, and the one-way clutch and inner race are disposed on an inner periphery of the boss.

With the increased number of speeds provided by a derailleur of a bicycle today, a multi-step sprocket wheel unit for the rear wheel includes an increased number of sprockets which is now usually at least five to seven. With the increased number of gears or sprockets, a wider range of torque can be applied from the sprockets to the freewheel. Often the sizes of the sprockets (i.e. the number of gear teeth on the sprockets) are configured for certain riding conditions, such as hilly or flat conditions. Moreover, the configuration of the sprockets or gears is designed for different rider skill levels or rider preferences. Accordingly, sometimes it is necessary to change freewheels or the entire rear wheel depending on the rider or riding conditions. Therefore, there are demands for a simplified mounting structure and an easy mounting method.

Furthermore, as the number of rear gears or sprockets have increased over the years, the freewheel has become larger and heavier. Additionally, with the increased number of gears or sprockets, rear hubs and freewheels can be complicated and expensive to manufacture and install. Moreover, with the increased number of gears or sprockets, it can be difficult to remove the rear wheel from the bicycle frame or to replace an existing freewheel with a different freewheel.

In view of the above, there exists a need for a bicycle hub with a detachable freewheel which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle hub with a spacer or a detachable freewheel that has a simplified structure.

Another object of the present invention is to provide a bicycle hub with a spacer for a detachable freewheel that allows simplified mounting.

Another object of the present invention is to provide a bicycle hub with a spacer for detaching a freewheel from a hub body that is relatively simple and inexpensive to manufacture and assemble.

The foregoing objects can basically be attained by providing a bicycle hub comprising a hub axle, a hub body, a sprocket support member and a spacer. The hub axle has a first portion and a second portion releasably coupled to the first portion. The hub body has an outer tubular portion and an interior passageway with the first portion of the hub axle rotatably supported therein. The sprocket support member has a portion releasably and non-rotatably coupled to the outer tubular portion of the hub body. The sprocket support member is mounted on the second portion of the hub axle. The spacer is supported on the first portion of the hub axle adjacent a free end of the hub body. The spacer has a spacing portion and is configured to move in a transverse direction relative to the hub axle between a first position and a second position without removing the first position of the hub axle from the hub body. In the first position, the spacing portion is located adjacent the hub axle. In the second position, the spacing portion is spaced from the hub axle.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
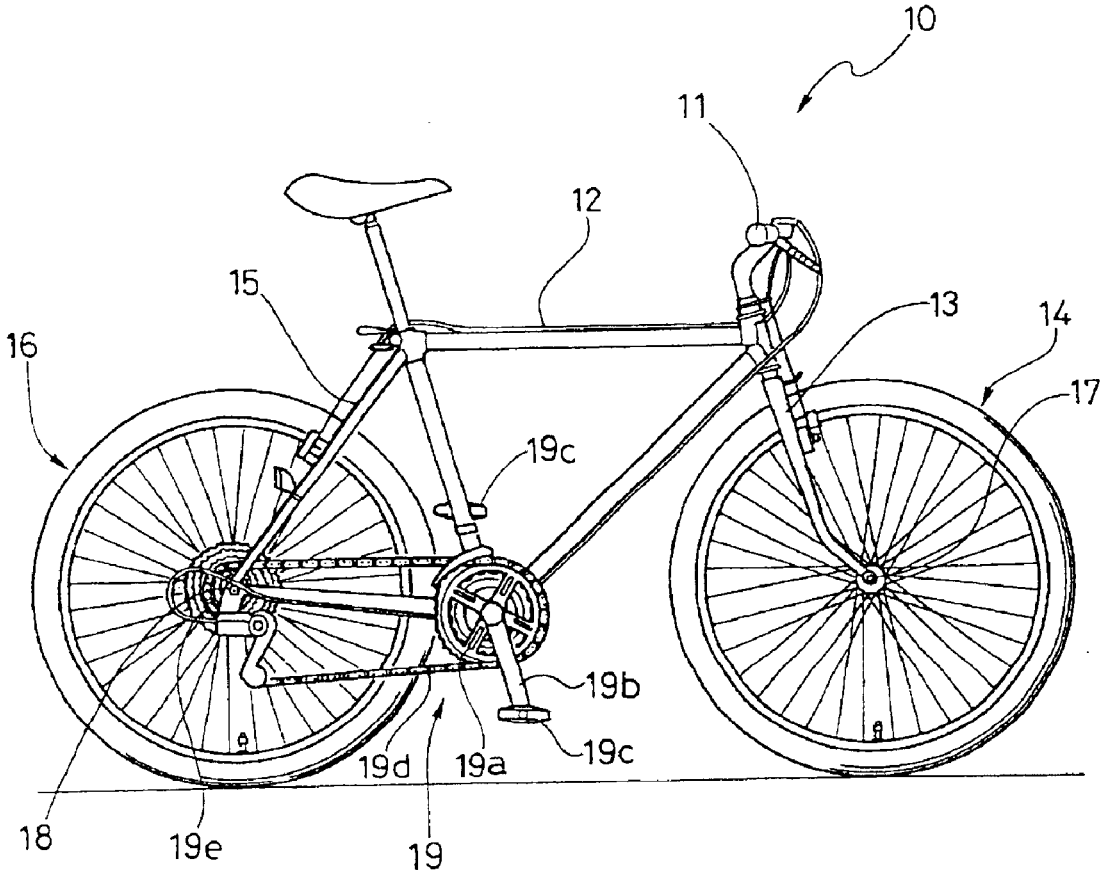
FIG. 1 is a side elevational view of a conventional bicycle with a rear bicycle hub in accordance with the present invention.

Referring initially to FIG. 1, a bicycle 10 is illustrated with a rear hub in accordance with the present invention installed thereon. Bicycle 10 basically has a frame 12 with a front fork 13 movably coupled thereto and a rear fork 15 fixedly coupled thereto. A rear wheel 16 is rotatably coupled to rear fork 15 via a rear hub 18. A front wheel 14 is rotatably coupled to front fork 13 via a front hub 17. A seat is adjustably coupled to frame 12 and a handlebar 11 is coupled to front fork 13 for turning front wheel 14. A drive train 19 is coupled to frame 12 for propelling bicycle 10. Drive train 19 basically includes a front set of sprockets 19a, a pair of crank arms 19b with pedals 19c, a drive chain 19d and a set of rear sprockets 19e. Front sprockets 19a are rotatably coupled to frame 12 via a bottom bracket (not shown). Rear sprockets 19e are coupled to rear hub 18 of rear wheel 16 in a relatively conventional manner.

Since the various components of bicycle 10 are well known in the art, these parts will not be discussed or illustrated in detail herein, except as they are modified in accordance with the present invention. More specifically, components of bicycle 10 will not be discussed or illustrated herein, except as they relate to rear hub 18. Moreover, it will be apparent to those skilled in the art from this disclosure that various conventional bicycle parts such as brakes, derailleurs, additional sprockets, etc., which are not illustrated and/or discussed herein, can be used in conjunction with the present invention.

Figure 2:
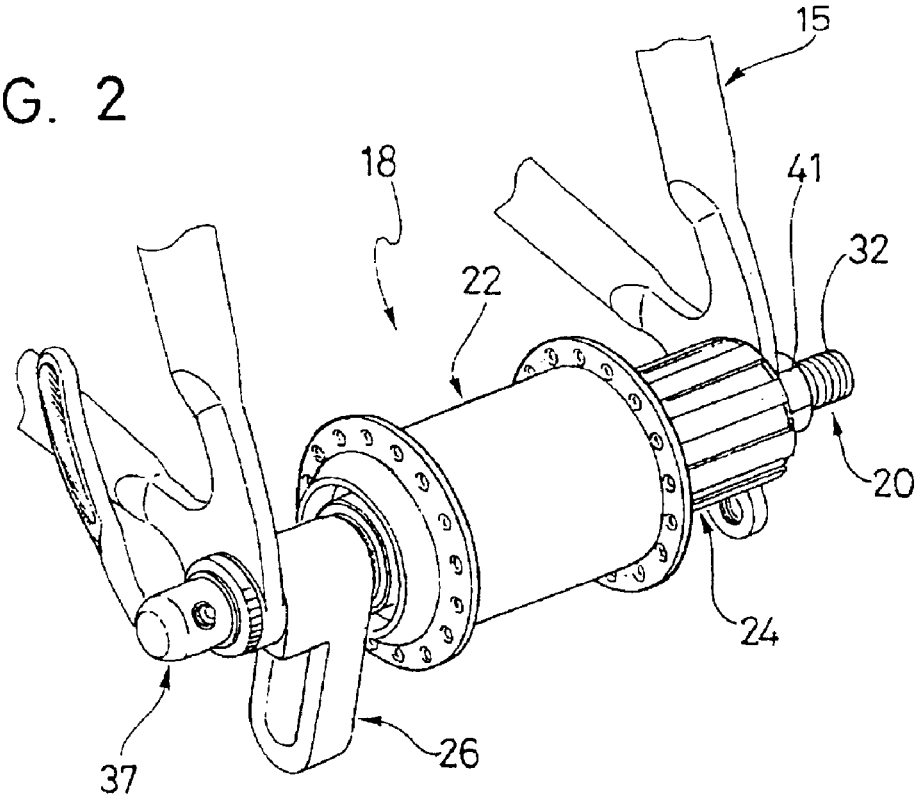
FIG. 2 is an enlarged perspective view of the rear hub mounted on the rear fork of the bicycle illustrated in FIG. 1 with a spacer in accordance with a first embodiment of the present invention located in a first or spacing position.
Figure 3:
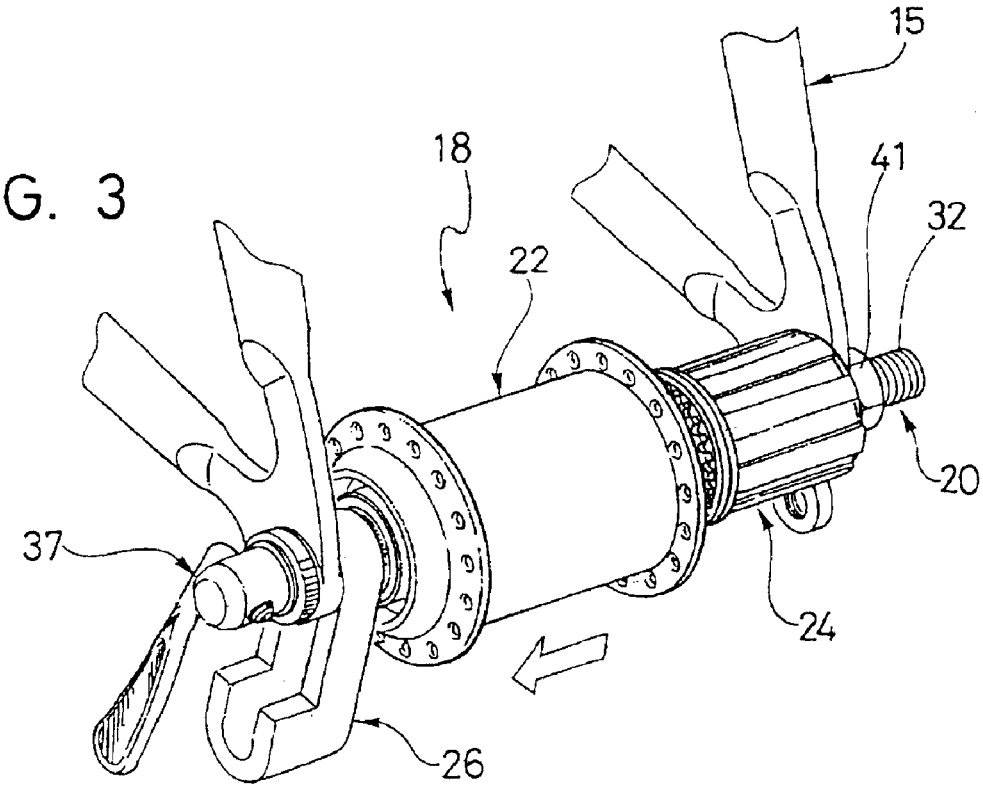
FIG. 3 is an enlarged perspective view of the rear hub mounted on the rear fork of the bicycle illustrated in FIG. 2 with the spacer of the first embodiment located in a second or release position.

Referring now to FIGS. 2–6, rear hub 18 basically includes a hub axle 20, a hub body 22, a freewheel 24 and a spacer 26. Hub axle 20 is rotatably supported within in interior passageway of hub body 22 and extends axially from both ends of hub body 22. Spacer 26 is preferably movably supported on one end of hub axle 20 adjacent a free end of hub body 22 to provide an axial space between hub body 22 and one side of rear fork 15, as seen in FIGS. 2 and 3. Freewheel 24 is preferably mounted on the other end of hub axle 20. Hub axle 20 is preferably formed of two parts releasably coupled together so hub body 22 can be separated from freewheel 24, as discussed in more detail below. Of course it will be apparent to those skilled in the art from this disclosure that the present invention can be used with hubs that do not have a freewheel. Thus, the term "sprocket support member" is used herein to refer to a portion of the hub that supports at least one sprocket with or without a freewheel.

Basically, a part of freewheel 24 is releasably and non-rotatably coupled to a part of hub body 22 when spacer 26 is in a first position and hub 18 is coupled to rear fork 15, as shown in FIG. 2. Hub axle 20 is formed of two parts releasably coupled together to allow release of freewheel 24 from hub body 22 without removing freewheel 24 from rear fork 15. Spacer 26 is movable from a first position to a second position to provide an axial space for hub body 22 to be slidably detached from freewheel 24, as shown in FIG. 3. Spacer 26 is only movable when hub 18 is not fixedly coupled to rear fork 15. In other words, when hub 18 is assembled and fixedly coupled to rear fork 15, spacer 26 is in the first position of FIG. 2 and does not move.

Figure 4:
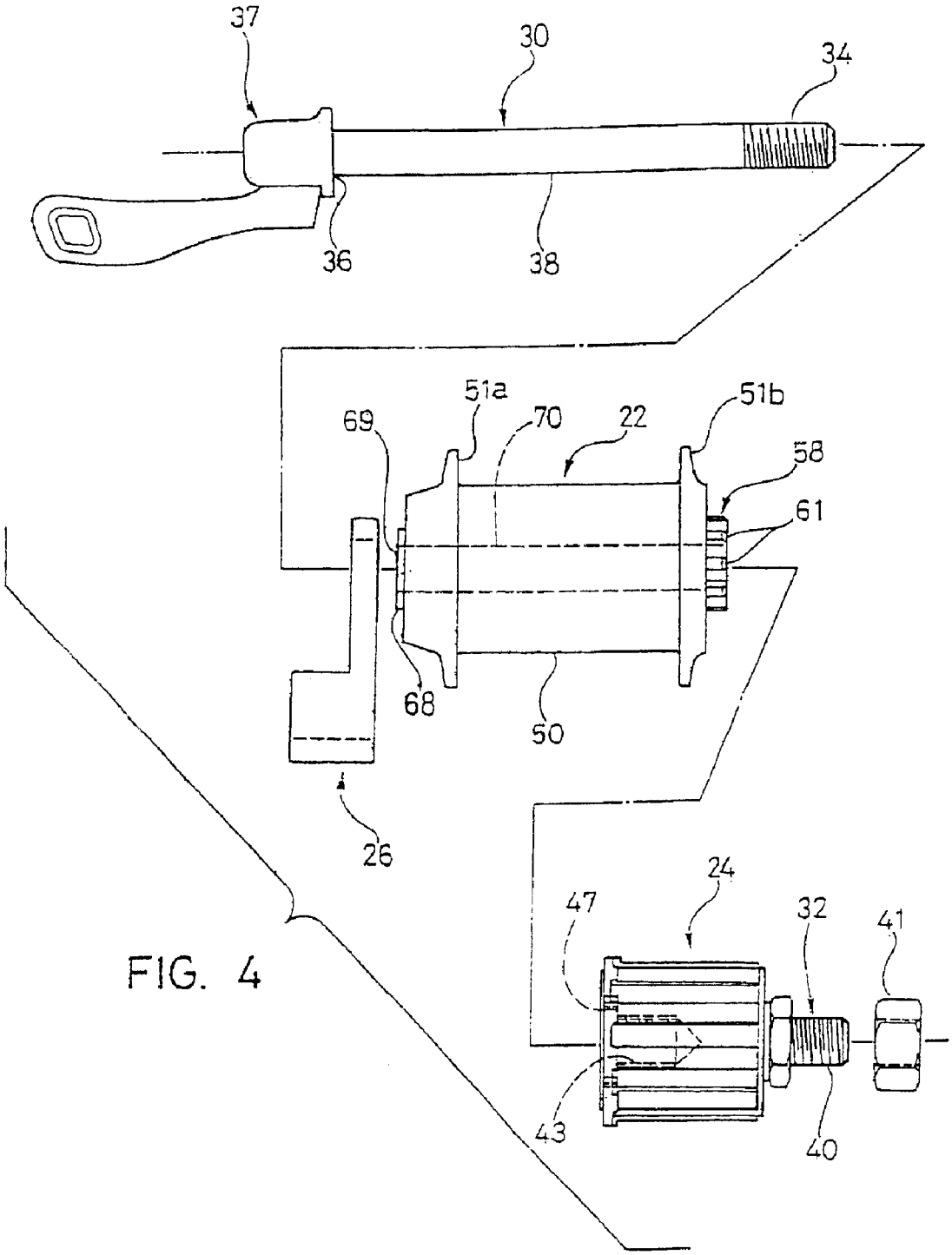
FIG. 4 is an enlarged, partially exploded elevational view of the rear hub illustrated in FIGS. 1–3.
Figure 5:
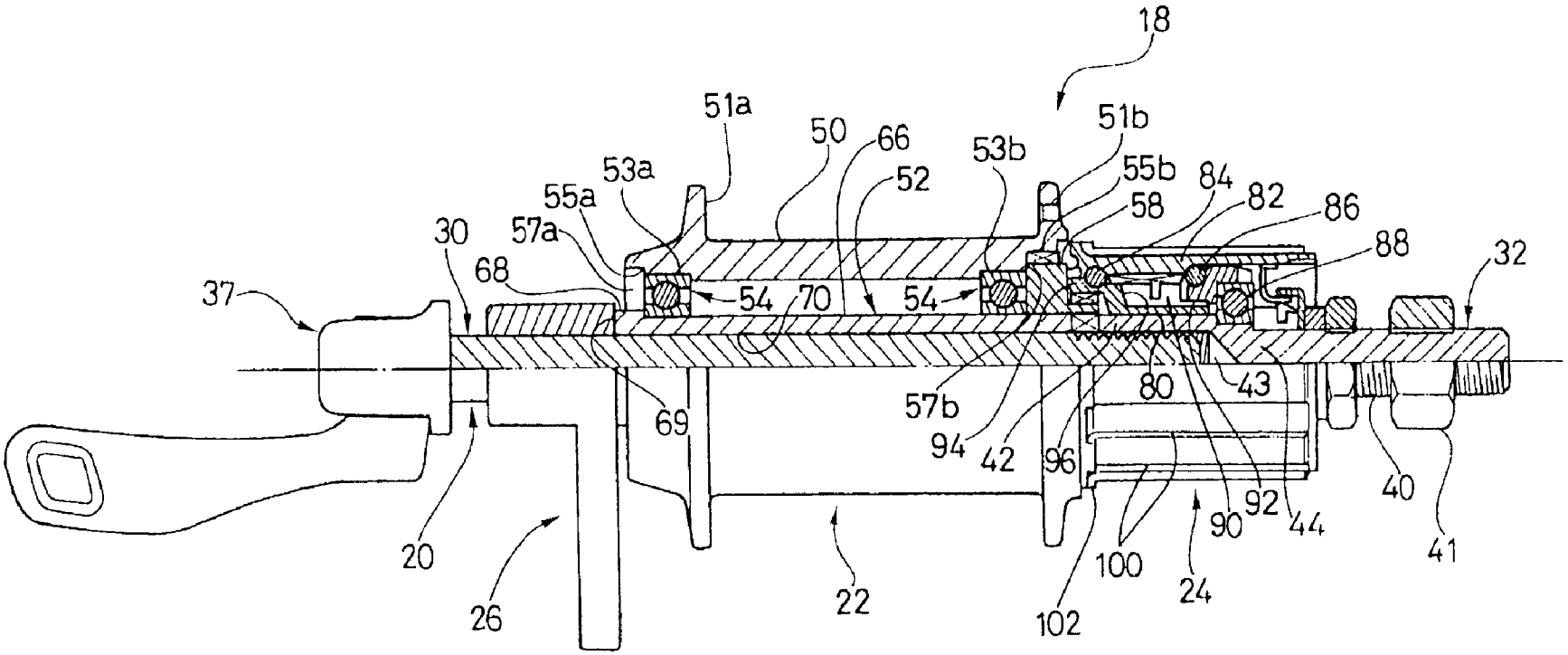
FIG. 5 is an enlarged, partial cross-sectional view of the rear hub illustrated in FIGS. 1–4 with the spacer in a first or spacing position.
Figure 6:
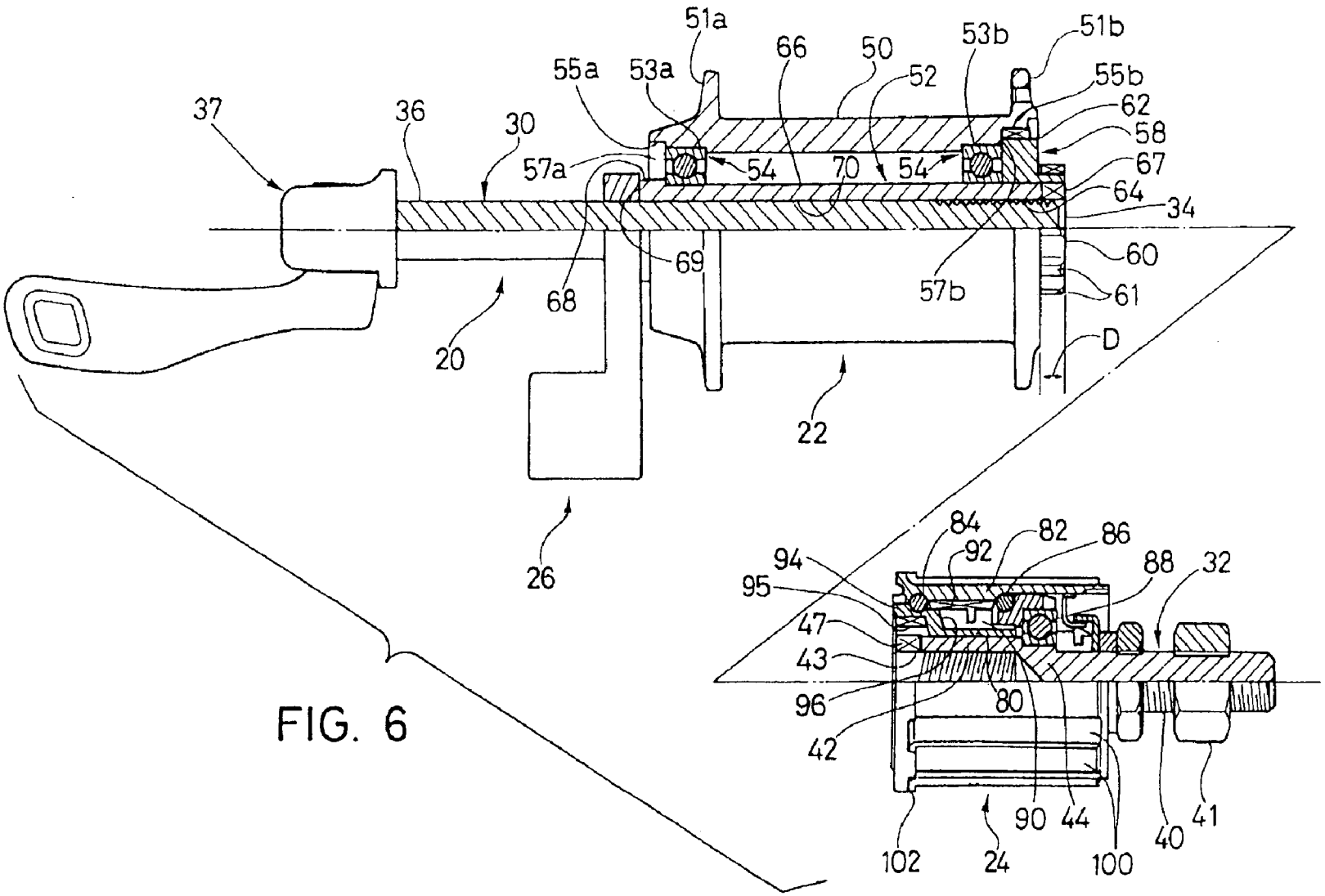
FIG. 6 is a partial cross-sectional view of the rear hub illustrated in FIG. 5 with the freewheel detached from the hub body and the spacer in a second or release position.

Hub axle 20 basically includes a first portion 30 and a second portion 32 releasably coupled to first portion 30, as best seen in FIGS. 4–6. Preferably, first portion 30 is rotatably supported within an interior passageway of hub body 22 and freewheel 24 is mounted on second portion 32 of hub axle 20. Moreover, first portion is preferably threadedly coupled to second portion 32 such that first portion 30 can be separated from second portion 32. Preferably, hub axle 20 has a diameter large enough to provide enough strength for separate hub axle 20. More specifically, first portion 30 of hub axle 20 preferably has a diameter of about ten millimeters and second portion 32 preferably has a minimum diameter of about ten millimeters to provide adequate strength for separate hub axle 20.

First portion 30 of hub axle 20 is preferably an elongated cylindrical member formed of lightweight, rigid metallic material, such as cast aluminum, titanium, or steel. Of course, first portion 30 could be constructed of any suitable material as needed and/or desired. Moreover, first portion 30 preferably has a substantially constant, circular cross-section with a diameter of about ten millimeters as mentioned above. First portion 30 of hub axle 20 includes a first end section 34, a second end section 36 axially spaced from first end section 34 and a central section 38 extending between first end section 34 and second end section 36 as best seen in FIG. 4.

First end section 34 is preferably provided with external threads for releasably coupling first portion 30 to second portion 32. Second end section 36 is provided with a quick release mechanism 37 coupled thereto in a conventional manner for coupling one side of the rear hub 18 to the rear fork 15 in a relatively conventional manner as discussed in more detail below.

Preferably, second portion 32 is a step-shaped cylindrical member having a varying cross-section for supporting freewheel 24, as best seen in FIGS. 5–6. Moreover, second portion 32 preferably has a minimum diameter of about ten millimeters and is preferably formed of lightweight, rigid metallic material, such as cast aluminum, titanium, or steel. Of course, second portion 32 could be constructed of any suitable material as needed and/or desired. Second portion 32 basically includes a first end section 40, a second end section 42 axially spaced from first end section 40 and a central stepped section 44 extending between first end section 40 and second section 42.

First end section 40 is preferably provided with external threads for receiving a nut 41. Nut 41 is threadedly coupled to first end section 40 for coupling one side of rear hub 18 to rear fork 15 in a relatively conventional manner. Moreover, first end section 40 preferably has the smaller or minimum external diameter of second portion 32. The minimum external diameter of first end section 40 is preferably about 10 millimeters as mentioned above. Second end section 42 preferably includes a threaded bore 43 formed therein for receiving externally threaded first end section 34 of first portion 30. Accordingly, when first portion 30 is threadedly coupled to second portion 32, first and second portions 30 and 32 act as a single axle member.

Second end section 42 also preferably has a plurality of circumferentially arranged gear teeth or splines 47 formed at a free edge thereof, as best seen in FIG. 6. More specifically, splines 47 extend axially toward first portion 30 from the threads of bore 43 and radially inwardly between threaded bore 43 and the free edge of second end section 42. Splines 47 are sized and configured to non-rotatably engage a portion of hub body 22 as will be discussed in more detail below.

Referring still to FIGS. 4–6, hub body 22 basically includes an outer tubular portion 50, a tubular inner sleeve portion 52 and a pair of bearing assemblies 54 rotatably coupling inner sleeve portion 52 and outer tubular portion 50 together in a freely rotatable manner. First portion 30 of hub axle 20 is preferably rotatably supported by inner sleeve portion 52 within the interior passageway of outer tubular portion 50. Outer tubular portion 50 is preferably releasably and non-rotatably coupled to a portion of freewheel 24 (i.e. a sprocket support member of freewheel 24) as will be discussed in more detail below.

Outer tubular portion 50 is a tubular member with varying internal and external circular cross-sections, as best seen in FIGS. 5–6. Moreover, outer tubular portion 50 is preferably formed of lightweight, rigid metallic material, such as cast aluminum, titanium, or steel. Of course, outer tubular portion 50 could be constructed of any suitable material as needed and/or desired. Outer tubular portion 50 basically includes a pair of annular spoke mounting flanges 51a and 51b axially spaced from each other for coupling hub body 22 to the rim of wheel 16 in a conventional manner. Spoke mounting flanges 51a and 51b extend from opposite sides of outer tubular portion 50 and are adjacent free ends of outer tubular portion 50. A plurality of spokes are coupled to mounting flanges 51a and 51b to secure hub body 22 to wheel 16 in a conventional manner.

Outer tubular portion 50 preferably includes a pair of abutment surfaces or abutment shoulders 53a and 53b facing in opposite directions for securing bearing assemblies 54 against longitudinal movement (i.e. axial) movement towards each other. Outer tubular portion 50 also preferably includes a pair of second abutment surfaces or shoulders 55a and 55b adjacent opposite free ends of outer tubular portion 50. In other words, abutment shoulders 53a and 53b face in axially opposite directions in an axially spaced arrangement, and abutment shoulders 55a and 55b are located axially on the free end sides of abutment shoulders 53a and 53b, respectively.

The pair of abutment shoulders 55a and 55b are axially spaced from the free ends of outer tubular portion 50 such that a pair of recesses 57a and 57b are formed adjacent the free ends of outer tubular portions 50. Other members can be received in recesses 57a and 57b. Specifically, recess 57a is an annular recess configured to receive a cap member or cover (not shown) and recess 57b is a splined annular recess sized and configured to non-rotatably receive an engagement member 58. Recess 57b includes a plurality of radially inwardly extending teeth or splines for non-rotatably mating with engagement member 58. In other words, outer tubular portion 50 preferably includes engagement member 58 non-rotatably coupled thereto.

As best seen in FIG. 6, engagement member 58 is an annular member and is preferably formed of rigid metallic material, such as cast aluminum, titanium, or steel. Of course, engagement member 58 could be constructed of any suitable material as needed and/or desired. Engagement member 58 is preferably frictionally retained in recess 57b and basically includes a first section 60, a second section 62 and a through bore 64. First section 60 has a smaller diameter than second section 62.

A plurality of first external teeth or splines 61 are formed on the external surface of first section 60 and a plurality of second external teeth or splines are formed on the external surface of second section 62, as best seen in FIG. 6. The second teeth or splines are non-rotatably engaged with internal teeth or splines of outer tubular portion 50. Preferably, second portion 62 is sized and configured to be received in recess 57b via a press fit or similar mounting method such that engagement member 58 is fixedly coupled with outer tubular portions 50.

First teeth 61 of first section 60 are sized and configured to non-rotatably and slidably engage a portion of freewheel 24. Accordingly, outer tubular portion 50 is releasably and non-rotatably coupled to a portion of freewheel 24. Additionally, through bore 64 is sized and configured to rotatably receive inner sleeve portion 52. More specifically, through bore 64 is preferably a circular through bore that has a slightly larger internal diameter than the external diameter of inner sleeve portion 52. Accordingly, engagement member 58 rotates with outer tubular portion 50 about inner sleeve portion 52 via bearing assemblies 54.

Of course, it will be apparent to those skilled in the art from this disclosure that engagement member 58 could be designed to slide relative to outer tubular portion 50 and be fixedly coupled to a portion of freewheel 24 if needed and/or desired. Moreover, engagement member 58 could be integrally formed with outer tubular portion 50 or a portion of freewheel 24 if needed and/or desired. In any case, engagement member 58 allows outer tubular portion 50 to be releasably and non-rotatably coupled to a portion of freewheel 24.

Bearing assemblies 54 are relatively conventional, and basically each include an inner race, a plurality of bearings or spherical steel balls and an outer race. Each outer race contacts an internal surface of outer tubular portion 50 and an abutment shoulder 53a or 53b of outer tubular portion 50 to secure bearing assemblies 54 against axial movement, as discussed above. Each inner race preferably contacts an external surface of inner sleeve portion 52 such that inner sleeve portion 52 is freely rotatable relative to outer tubular portion 50. A cap member (not shown) and engagement member 58 also preferably secure bearing assemblies 54 against axial or longitudinal movement away from abutment shoulders 53a and 53b relative to hub body 22.

Still referring to FIGS. 5 and 6, inner sleeve portion 52 is preferably an elongated tubular member with a circular cross-section. Additionally, inner sleeve portion 52 is preferably formed of lightweight, rigid metallic material, such as cast aluminum, titanium or steel. Of course, inner sleeve portion 52 could be constructed of any suitable material as needed and/or desired. Inner tubular portion 52 basically includes a supporting section 66, an abutment section 68 and a through bore 70.

Abutment section 68 has a larger diameter than supporting section 66 for retaining the inner race of one of bearing assemblies 54 against axial movement away from abutment shoulder 53a. Abutment section 68 also includes an abutment surface 69 arranged at a free edge of abutment section 68. Abutment surface 69 also forms the free end of hub body 22 and is arranged to contact a portion of spacer 26. Through bore 70 extends axially through supporting section 66 and abutment section 68 of inner sleeve portion to rotatably receive hub axle 20. More specifically, through bore 70 of inner sleeve portion 52 is sized and configured to rotatably and slidably receive first portion 30 of hub axle 20.

Supporting section 66 preferably includes a plurality of teeth or splines 67 arranged at a free end thereof. Teeth 67 are sized and configured to non-rotatably and releasably engage teeth 47 of second portion 32 of hub axle 20. Specifically, teeth or splines 67 are axially extending teeth or splines and are circumferentially arranged around inner sleeve 52 to mate with inwardly extending teeth 47. Accordingly, first portion 30 can be rotated relative to second portion 32 and inner tubular sleeve portion 52 when teeth 67 and 47 are non-rotatably engaged with each other. Moreover, once first portion 30 is tightened with second portion 32, and hub 18 is coupled to rear fork 15, inner sleeve portion 52 is non-rotatably coupled with second portion 32. Therefore, inner sleeve portion 52, first portion 30 and second portion 32 act as a single axle of rear hub 18 when hub 18 is fully assembled and coupled to rear fork 15.

Figure 7:
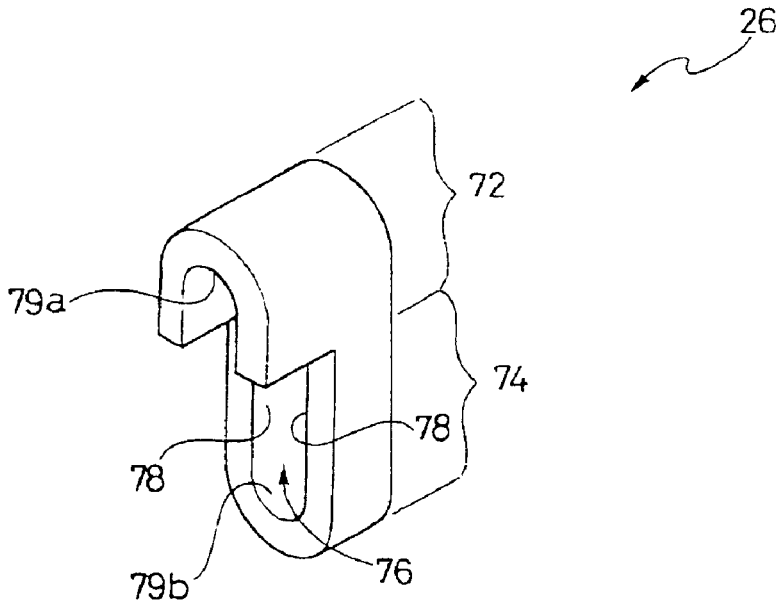
FIG. 7 is an enlarged perspective view of the spacer of the rear hub illustrated in FIGS. 1–6.
Figure 8:
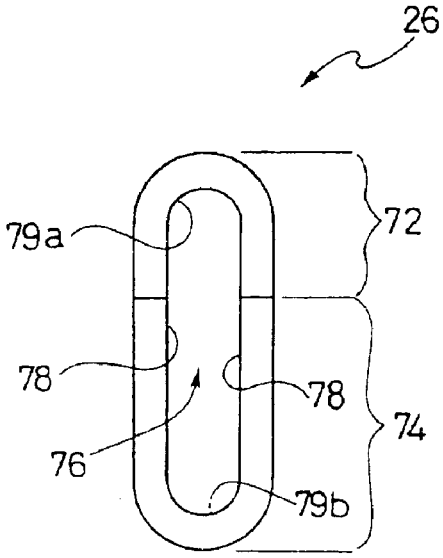
FIG. 8 is an end elevational view of spacer illustrated in FIG. 7.
Figure 9:
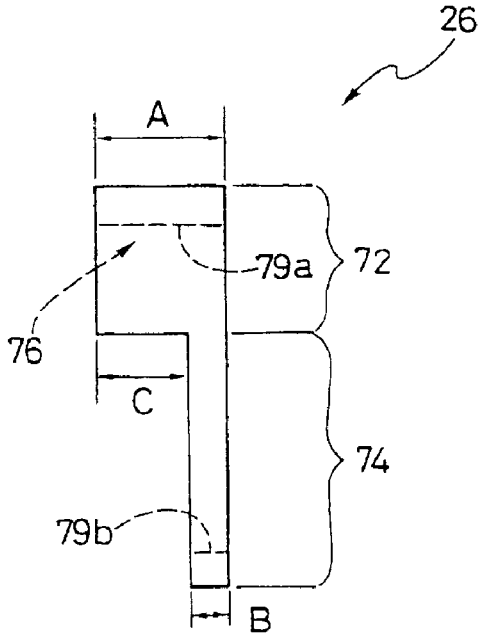
FIG. 9 is a side elevational view of spacer illustrated in FIGS. 7 and 8.

Referring now to FIGS. 7–9, spacer 26 is an oblong step shaped member supporting on first portion 30 of hub axle 20 adjacent abutment surface or free end 69 of hub body 22. Spacer 26 is configured to move in a transverse direction relative to hub axle 20. Spacer 26 is preferably constructed of rigid, lightweight metallic material such as cast aluminum, titanium, steel, etc. Moreover, spacer 26 is preferably constructed as a one-piece, unitary member. Of course, it will be apparent to those skilled in the art from this disclosure that spacer 26 could be constructed of alternate materials or several pieces as needed and/or desired. Spacer 26 basically includes a spacing portion 72 and a release portion 74 extending from spacing portion 72 to form an elongated slot 76. First portion 30 of hub axle 20 is located in slot 76.

Spacing portion 72 has a first axial length A larger then a second axial length B of release portion 74, as best seen in FIG. 9. Axial lengths of spacer 26 are measured along the center longitudinal axis of hub 18 when assembled. In other words, spacing portion 72 extends axially, release portion 74 extends in a transverse direction relative to spacing portion 72. Moreover, spacing portion 72 preferably has an axial length A at least twice the axial length B of release portion 74. More specifically, spacing portion 72 preferably has an axial length A about three times axial length B of release portion 74.

Accordingly, an axial space C can be provided that corresponds to the difference between axial length A and axial length B, as best seen in FIG. 9. The axial length of space C is at least as large as an axial length D of first section (engagement section) 60 of engagement member 58. Preferably, space C is sufficiently larger than axial length D such that hub body 50 can be axially disengaged from freewheel 24 when spacer 26 is in the second position. Release portion 74 is axially arranged on one side of spacing portion 72. Additionally, spacer 26 is preferably arranged on hub axle 20 such that release portion 74 is adjacent abutment surface 69.

Spacing portion 72 is configured to move between a first position in which spacing portion 72 is located adjacent hub axle 20 (i.e. first portion 30) and a second position in which spacing portion 72 is spaced from hub axle 20 (i.e. first portion 30), as best seen in FIGS. 2 and 3. Spacer 26 can be moved between the first and second positions without removing first portion 30 from hub body 22. *Thus, release portion 74 is spaced from hub axle 20 in the first position, and located adjacent hub axle 20 in the second position.* Slot 76 is a closed slot to allow movement of spacer 26 between the first and second positions without falling off of hub axle 20 (i.e. first portion 30) and is sized and configured to slidably receive first portion 30 of hub axle 20.

In the first position, spacing portion 72 is axially aligned with the free end of hub body 22 (i.e., abutment surface 69 of inner sleeve portion 52) and quick release 37. In the second position, spacing portion 72 not axially aligned with the free end (i.e. abutment surface 69) of hub body 22 or quick release 37 such that hub body 22 can move away from freewheel 24. More specifically, release portion 74 with the smaller axial length is axially aligned with the free end (i.e. abutment surface 69) of hub body 22 and quick release 37 in the second position such that hub body 22 can be detached from freewheel 24. Spacing portion 72 is axially aligned with an abutment surface of quick release mechanism 37 in the first position so that hub 18 can be coupled to rear fork 15.

Preferably, slot 76 is an elongated slot extending through spacing portion 72 and release portion 74. Slot 76 is formed with a pair of axially extending sidewalls 78, a first semi-circular curved section 79a formed in spacing portion 72, and a second semi-circular section 79b formed in release portion 74, as best seen in FIGS. 7 and 8. Sidewalls 78 are generally flat L-shaped surfaces spaced apart from each other such that spacer 26 can be moved between the first and second positions. Slot 76 preferably has a length long enough such that spacing portion 72 can be moved completely out of axial alignment with quick release mechanism 37 and the free end of hub body 22 (i.e., abutment surface 69 of inner sleeve portion 52) to be spaced from hub axle 20. Therefore, removal of first portion 30 from hub body 22 is not necessary to remove rear wheel 16 from rear fork 15 after rear hub 18 has been assembled and coupled to rear fork 15.

Referring again to FIGS. 5 and 6, freewheel 24 basically includes an inner tubular body 80, an outer tubular body 82 coaxially mounted on inner tubular body 80, a first bearing assembly 84, a second bearing assembly 86, a third bearing assembly 88 and a one-way clutch 90. First and second bearing assemblies 84 and 86 rotatably couple inner tubular body 80 to outer tubular body 84. Third bearing assembly 88 rotatably couples inner tubular body about second portion 32 of hub axle 20. One-way clutch 90 is coupled between inner tubular body 80 and outer tubular body 84 so as to allow one way rotation between inner and outer tubular bodies 80 and 82.

Inner tubular body 80 is releasably and non-rotatably coupled to outer tubular portion 50 of hub body 22 via engagement member 58 when hub 18 is assembled and coupled rear fork 15. As mentioned above, freewheel 24 is coupled to rear hub 18 and many parts of freewheel 24 are relatively conventional. Accordingly, freewheel 24 will not be discussed or illustrated in detail herein, except as modified in accordance with the preferred embodiments of the present invention.

In the preferred embodiment, outer tubular body 82 has seven sprockets 19e non-rotatably mounted to the external surface of outer tubular body 82. The spacing between sprockets 19e are maintained by a plurality of spacers in a conventional manner. Accordingly, in the preferred embodiment, freewheel 24 can be considered a sprocket support member. Alternatively, inner tubular body 80 can also be considered the sprocket support member since inner tubular member indirectly supports sprockets 19e. In any case, the sprocket support member or freewheel 24 has a portion releasably and non-rotatably coupled to outer tubular portion 50 of hub body 22 when hub 18 is assembled and coupled rear fork 15.

Of course, it will be apparent to those skilled in the art from this disclosure that freewheel 24 could have more/fewer sprockets 19e as needed and/or desired. For example, freewheel 24 could have a single sprocket 19e coupled thereto. Moreover, it will be apparent to those skilled in the art from this disclosure that an alternate sprocket support member can be provided if needed and/or desired. For example, a simplified sprocket support member could be provided that does not include one-way clutch 90 or other parts of freewheel 24. Accordingly, a "sprocket support member" as used herein includes any member(s), which directly or indirectly supports at least one sprocket.

Referring still to FIGS. 5 and 6, inner tubular body 80 will now be discussed in more detail. Preferably, inner tubular body 80 is constructed of a rigid lightweight material, such as cast aluminum, titanium, steel, etc. Inner tubular body 80 has a step-shaped configuration with an axially extending bore defining a step-shaped internal surface. Basically, inner tubular body 80 has a first inner section 92, a second inner section 94 and an annular wall 96 extending between first inner section 92 and second inner section 94. First inner section 90 has a first effective diameter, while second inner section 94 has a second effective diameter that is larger than the first diameter of the first inner section 92.

First inner section 92 is a tubular section coupled to an inner race of second bearing assembly 86 for rotation therewith. The internal diameter of fist inner section 92 is slightly larger than the external diameter of second portion 32, which supports freewheel 24. Annular wall 96 extends radially outward from first inner section 92 to second inner section 94 to provide a space for one-way clutch 90. Second inner section 94 is a tubular section with a set of teeth or splines 95 formed about its internal surface. Teeth 95 extend radially inwardly and are sized and configured to non-rotatably and releasably engage first teeth 61 of engagement member 58.

Referring still to FIGS. 5 and 6, outer tubular body 82 will now be discussed in more detail. Outer tubular body 82 is preferably formed as a one-piece, unitary member constructed of a substantially hard, rigid material. For example, outer tubular body 80 can be constructed of a lightweight metallic material such as aluminum or titanium or a slightly heavier material such as steel. Outer tubular body 82 has an external surface with a plurality of splines 100 extending around its periphery for non-rotatably securing sprockets 19e thereon in a conventional manner. Each of the splines 100 has an abutment stopper 102 extending radially outwardly therefrom. The abutment stoppers 102 limit axial movement of the sprockets 19e on the external surface of outer tubular body 82 in a conventional manner.

One-way clutch 90 is conventional and includes a pawl spring and a pair of pawls (not shown) located 180° apart from each other on the pawl spring. One-way clutch 90 also includes portions of inner and outer tubular bodies 80 and 82 in a conventional manner. In particular, one-way clutch 90 includes an annular groove and a pair of pawl seats of inner tubular body 80 and ratchet teeth of outer tubular body 82. The pawl spring is located within groove for securing the pawls in the pawl seats in a conventional manner. The pawls normally engage the ratchet teeth such that outer tubular body 82 can rotate in one direction about the longitudinal axis but cannot rotate in the other direction in a conventional manner.

Referring now to FIGS. 4 and 10–14, assembly and operation of rear hub 18 will now be discussed in more detail. Preferably, second portion 32 of hub axle 20 has freewheel 24 already mounted thereon, and hub body 22 is basically assembled as seen in FIG. 4. First portion 30 and spacer 26 are not yet connected to hub body 22 and second portion 32. In assembling rear hub 18, hub body 22 (inner sleeve 52 and engagement member 58) is non-rotatably engaged with freewheel 24 (second portion 32 and inner tubular body 80, respectively). First portion 30 with spacer 26 mounted thereon is then slidably inserted into inner tubular portion 52 of hub body 22 and rotatably coupled to second portion 32, such that hub body 22 and second portion 32 with freewheel 24 mounted thereon are in close tight contact with each other.

Figure 10:
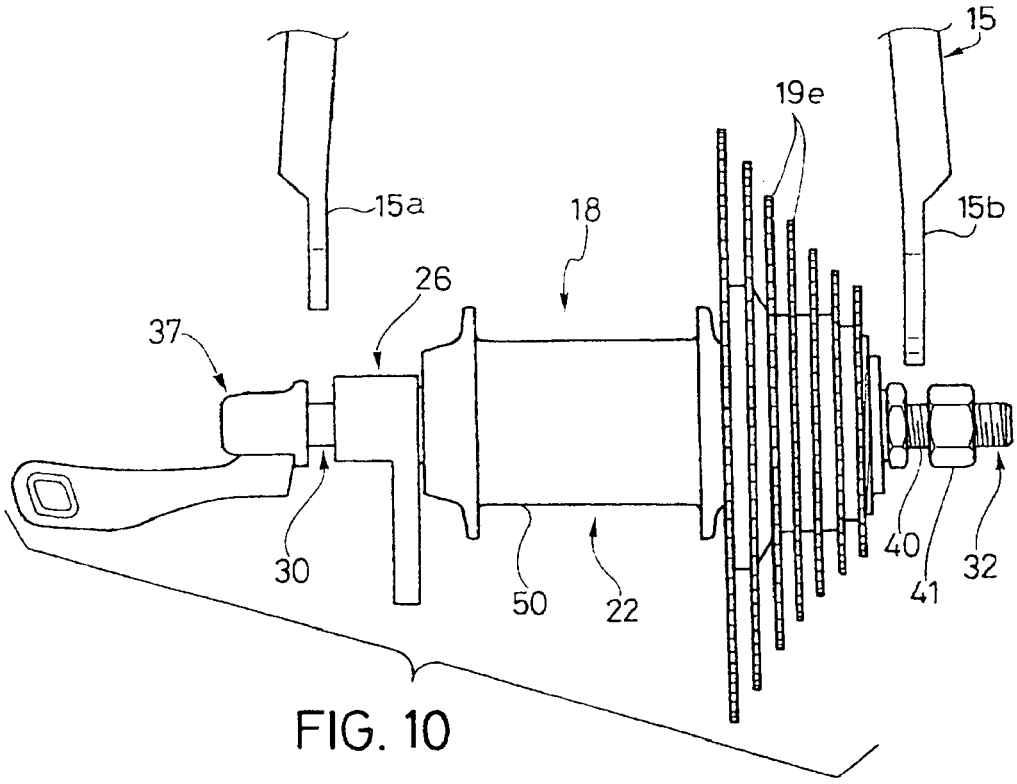
FIG. 10 is a side elevational view of the rear hub illustrated in FIGS. 1–6, prior to mounting the assembled hub on the rear fork of the bicycle.
Figure 12:
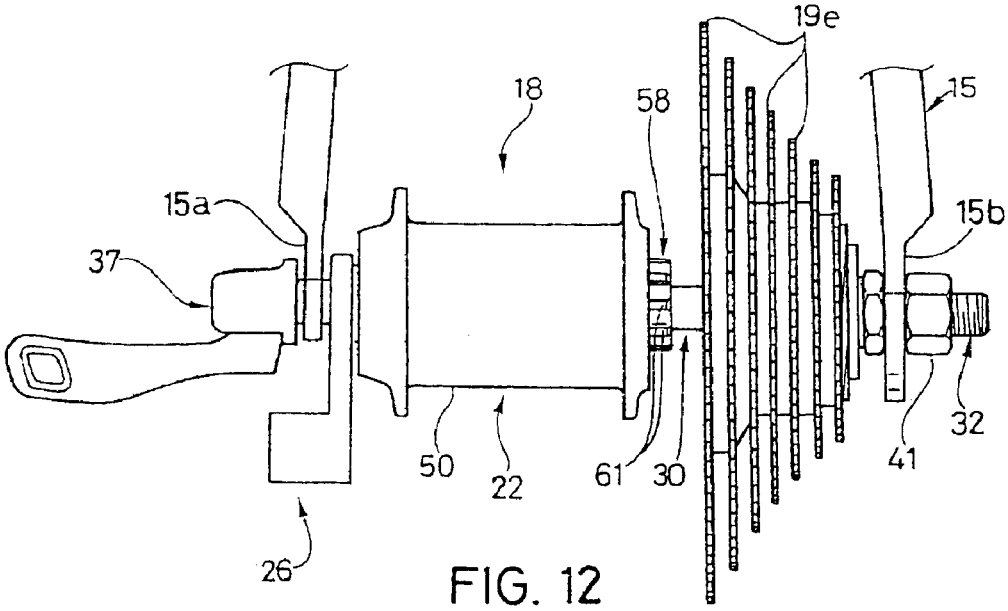
FIG. 12 is a side elevational view of the rear hub illustrated in FIGS. 1–6, 10 and 11, with one side of the rear hub released from the rear fork of the bicycle, and the hub body spaced from the freewheel.
Figure 13:
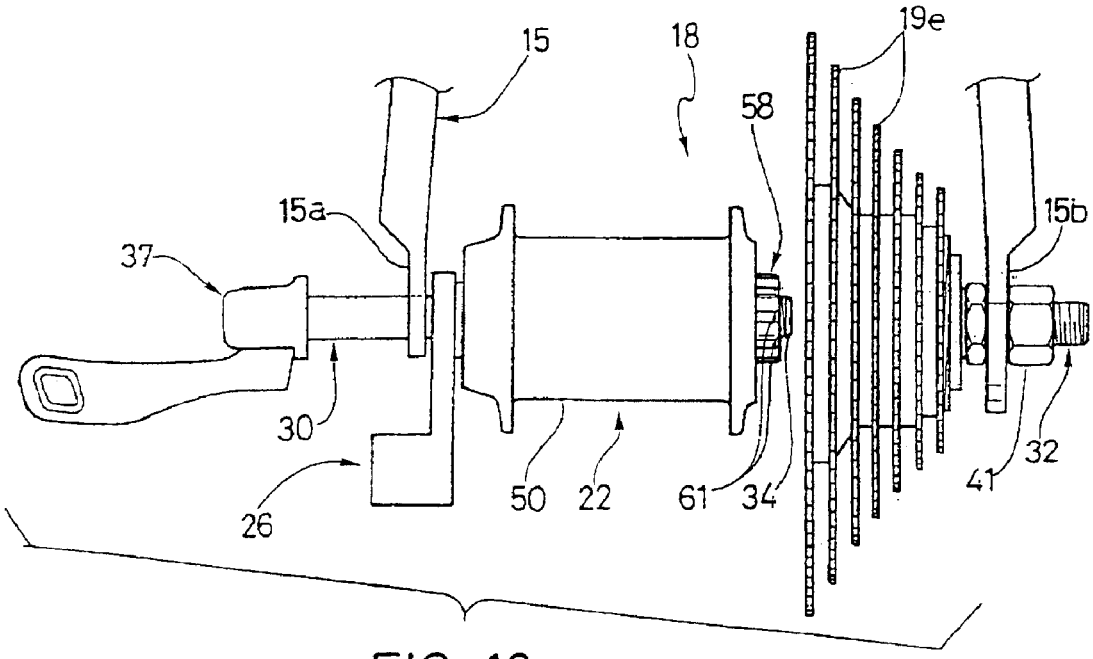
FIG. 13 is a side elevational view of the rear hub illustrated in FIGS. 1–6 and 10–12, with the hub body released from the rear fork of the bicycle and detached from the freewheel.
Figure 14:
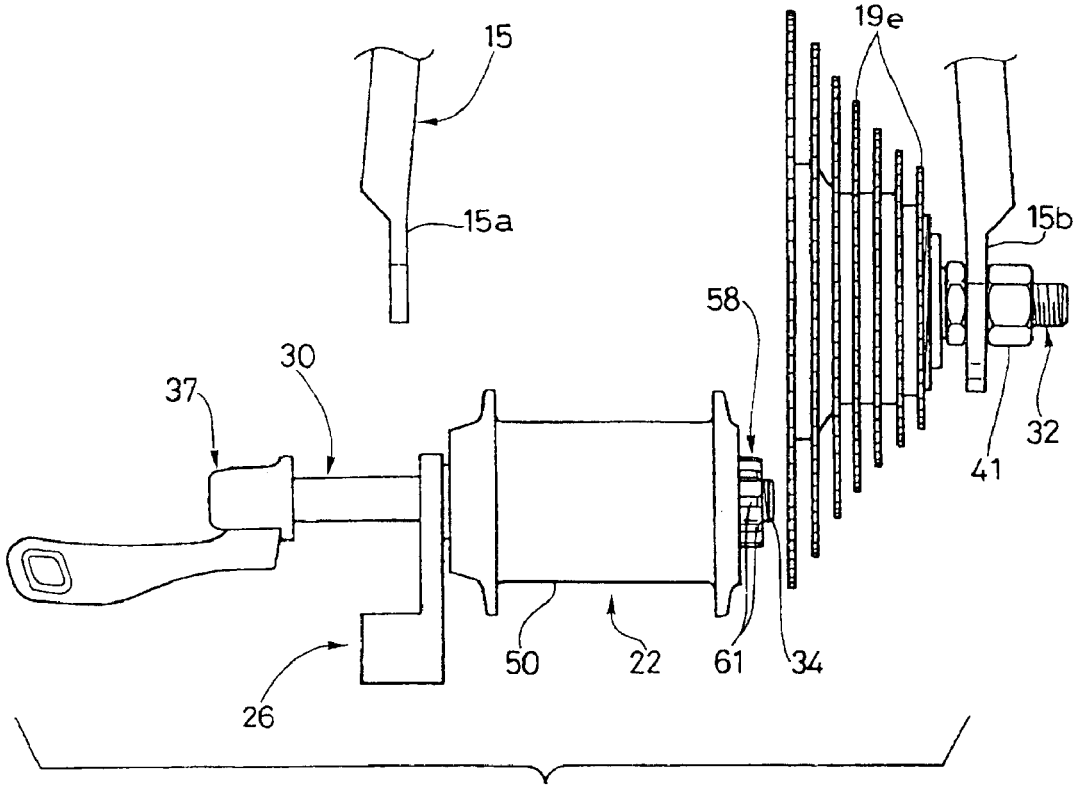
FIG. 14 is a side elevational view of the rear hub illustrated in FIGS. 1–6 and 10–13, with the hub body completely removed from the rear fork of the bicycle.

Spacer 26 is preferably arranged such that spacing portion 72 extends toward quick release 37. With this arrangement, when release portion 74 is axially aligned with quick release 37 and the free end of hub body 22, such that spacing portion 72 will not interfere with spoke mounting flange 51a of outer tubular portion 50 as seen in FIGS. 12–14. As seen in FIG. 10, when installing the assembled rear hub 18 in rear fork 15, spacing portion 72 is arranged to be axially aligned with quick release 37 and the free end of hub body 22. In other words, spacing portion 72 is located adjacent hub axle 20 and adjacent abutment surface 69 of inner sleeve portion 52. The parts of rear hub 18 are held in close contact so a pair of mounting portions 15a and 15b of rear fork 15 can be mounted on hub axle 20, as seen in FIG. 10. Mounting portions 15a and 15b are plate members, each having a mounting slot formed therein in a conventional manner.

Figure 11:
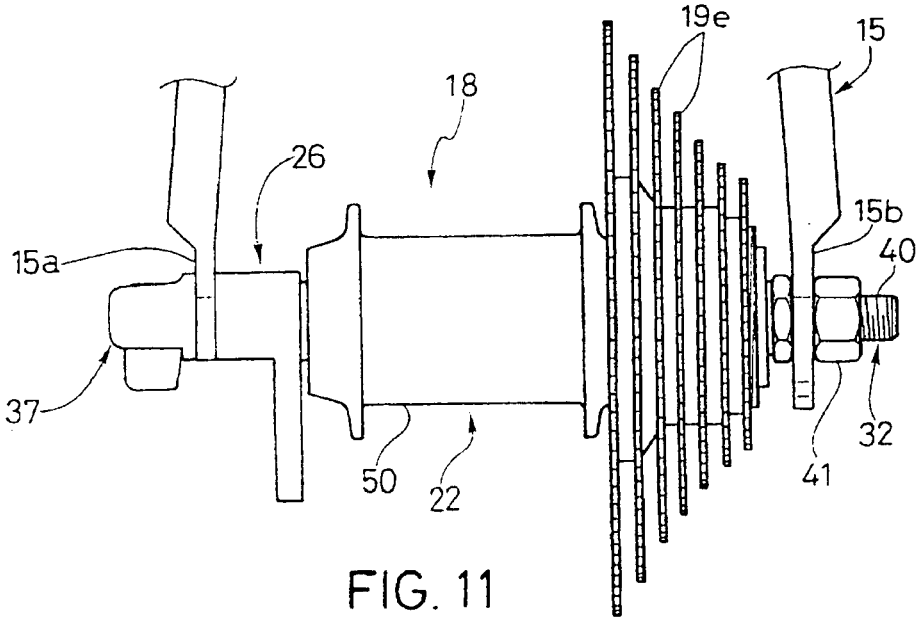
FIG. 11 is a side elevational view of the rear hub illustrated in FIGS. 1–6 and 10, after mounting the assembled hub on the rear fork of the bicycle.

After hub axle 20 is properly aligned in the mounting slots of mounting portions 15a and 15b, nut 41 is tightened against mounting portion 15a and quick release 37 is tightened down against mounting portion 15b such that rear hub 18 is fixedly coupled to rear forks 15a and 15b, as seen in FIG. 11. In this arrangement, first and second portions 30 and 32 of hub axle 20, together with inner sleeve portion 52 act as a single hub axle of rear hub 18 (shown in FIG. 5 and discussed above). Additionally, in this assembled position, free wheel 24 and outer tubular portion 50 act in a conventional manner to supply driving torque to the rear wheel of the bicycle.

Referring to FIGS. 12–14, when the rider needs to remove the rear wheel, the rear wheel can be removed without removing the second portion 32 and the free wheel 24 from mounting portion 15a. Specifically, the handle of quick release 37 is rotated to release mounting portion 15b from hub 18 and spacer 26 is moved transverse to first portion 30 (i.e. spacing portion 72 is moved to the second position). Accordingly, spacing portion 72 is moved out of alignment with abutment surface 69 and mounting portion 15b, and release portion 74 is axially aligned with mounting portion 15b and the free end of hub body 22. Therefore, an axial space is created between mounting portion 15b, spacer 26 and abutment surface 69.

Once the axial space is provided, hub body 22 can be moved axially away from second portion 32 and freewheel 24 and non-rotatably disengaged therefrom, as also seen in FIG. 12. However, hub body 22 cannot be completely removed from rear fork 15 until first portion 30 in no longer threadedly engaged with second portion 32. Accordingly, it is necessary to completely threadedly disengage first portion 30 from second portion 32 in order to remove hub body 22 from second portion 32, freewheel 24 and rear fork 15, as seen in FIG. 13. First portion 30 of hub axle 20 can be rotated relative to second portion 32 of hub axle 20 to release first portion 30 from second portion 32 before or after hub body 22 is axially moved away from freewheel 24.

With the arrangement of the present invention, it is not necessary to remove the drive chain 19d from the rear sprocket 19e because the freewheel 24, rear sprocket 19e and second portion 32 of hub axle 20 remain fixedly coupled to mounting portion 15a. Now, the rear wheel 16 can be removed and repaired or adjusted without removing the other portions of rear hub 18 from the bicycle 10, as seen in FIG. 14. Once the desired wheel maintenance is completed, hub body 22 can be easily reinstalled and connected to second portion 32 and freewheel 24 in the same manner as the initial assembly, and described above.

Second Embodiment

Figure 15:
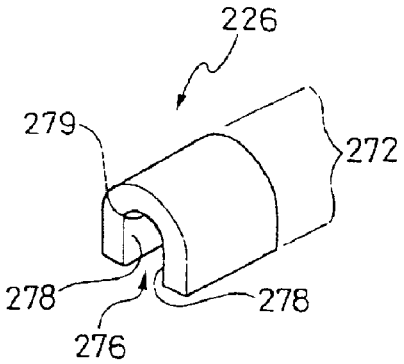
FIG. 15 is a perspective view of a modified spacer in accordance with a second embodiment of the present invention.

Referring to FIG. 15, a spacer 226 is illustrated in accordance with a second embodiment of the present invention. This second embodiment is identical to the first embodiment except spacer 26 of the first embodiment has been modified in this second embodiment. Specifically, spacer 226 of this second embodiment does not include release portion 74 of the first embodiment. Descriptions of rear hub 18 of the first embodiment also apply to this second embodiment except as modified below. Moreover, spacer 226 is sized and configured to be used with rear hub 18 of the first embodiment. Accordingly, this second embodiment will not be discussed or illustrated in detail herein.

Spacer 226 is a U-shaped member formed of lightweight, rigid metallic material, such as cast aluminum, titanium or steel. Preferably, spacer 226 is formed as a one-piece, unitary member. Of course spacer 226 could be constructed of other materials or several parts as needed and/or desired. Spacer 226 basically includes a spacing portion 272 (similar to spacing portion 72 of the first embodiment) with an open-ended slot 276 formed therein. A pair of sidewalls 278 spaced from each other and a semicircular end wall 279 connecting sidewalls 278 form open-ended slot 276. Slot 276 is sized and configured to receive first portion 30 of hub axle 20 therein. Spacer 226 can be completely removed from first portion 30 without removing first portion 30 from hub body 22. Spacer 226 requires less material than spacer 26 of the first embodiment. Accordingly, spacer 226 is lighter than spacer 26 of the first embodiment.

Third Embodiment

Figure 16:
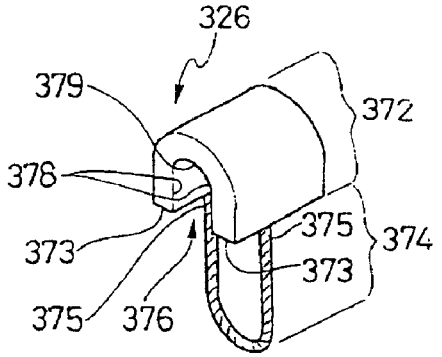
FIG. 16 is a perspective view of a modified spacer in accordance with a third embodiment of the present invention.

Referring to FIG. 16, a spacer 326 is illustrated in accordance with a third embodiment of the present invention. This third embodiment is identical to the first embodiment except spacer 26 of the first embodiment has been modified in this third embodiment. Specifically, spacer 326 of this third embodiment does not include release portion 74 of the first embodiment and includes a modified cable loop release portion 374. Descriptions of rear hub 18 of the first embodiment also apply to this third embodiment except as modified below. Moreover, spacer 326 is sized and configured to be used with rear hub 18 of the first embodiment. Accordingly, this third embodiment will not be discussed or illustrated in detail herein.

Spacer 326 basically includes a spacing portion 372 (similar to spacing portion 72 of the first embodiment) and a cable loop release portion 374. An open-ended slot 376 is formed spacing portion 372. Accordingly, spacing portion 372 is a U-shaped member with a pair of free ends 373 and is preferably formed of lightweight, rigid metallic material, such as cast aluminum, titanium or steel. A pair of sidewalls 378 spaced from each other and a semicircular end wall 379 connecting sidewalls 378 form open-ended slot 376. Slot 376 is sized and configured to receive first portion 30 of hub axle 20 therein. Preferably, spacing portion 372 is formed as a one-piece, unitary member. Of course spacing portion 372 could be constructed of other materials or of several parts as needed and/or desired.

Cable loop release portion 374 is preferably a flexible metallic wire or cable with a pair of connecting ends 375 fixedly coupled to free ends 373 of spacing portion 372, such as by welding or other conventional techniques. Moreover, release portion 374 is preferably axially centered relative to spacing portion 372. Spacer 326 can not be completely removed from first portion 30 without removing first portion 30 from hub body 22 due to cable loop release portion 374. Accordingly, spacer 326 will not be easily lost. Additionally, spacer 326 requires less material than spacer 26 of the first embodiment. Accordingly, spacer 326 is lighter than spacer 26 of the first embodiment.

Fourth Embodiment

Figure 17:
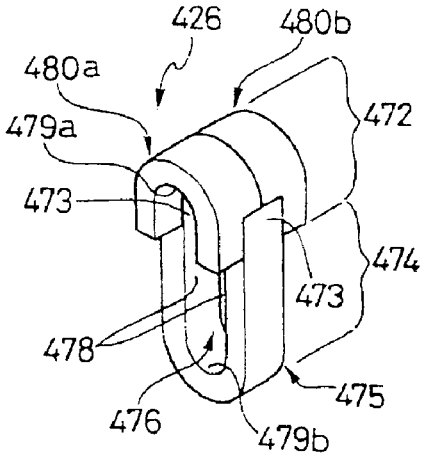
FIG. 17 is a perspective view of a modified spacer in accordance with a fourth embodiment of the present invention.
Figure 18:
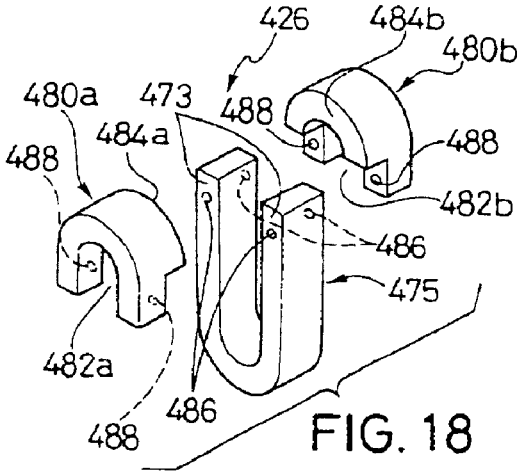
FIG. 18 is an exploded, perspective view of the modified spacer illustrated in FIG. 17.

Referring to FIGS. 17–18, a spacer 426 is illustrated in accordance with a fourth embodiment of the present invention. This fourth embodiment is identical to the first embodiment except spacer 26 of the first embodiment has been modified in this fourth embodiment. Specifically, spacer 426 of this fourth embodiment is formed of several pieces snap-fitted together. Descriptions of rear hub 18 of the first embodiment also apply to this fourth embodiment except as modified below. Moreover, spacer 426 is sized and configured to be used with rear hub 18 of the first embodiment. Accordingly, this fourth embodiment will not be discussed or illustrated in detail herein.

Spacer 426 basically includes a spacing portion 472 and a release portion 474 similar to the first embodiment. An elongated slot 476 is formed by release portion 474 and spacing portion 472. Release portion 474 includes a U-shaped member 475 with a pair of free ends 473 forming a part of spacing portion 472. Spacing portion 472 further includes a pair of U-shaped spacing elements 480a and 480b. Each spacing element 480a or 480b has a stepped configuration and an open-ended slot 482a or 482b formed therein, respectively. Accordingly, spacing portion 472 is formed by spacing element 480a, spacing element 480b and free ends 473 of U-shaped member 475. The part of U-shaped member 475 extending from spacing elements 480a and 480b forms release portion 474. Preferably, spacing elements 480a and 480b contact each other at axially central surfaces 484a and 484b.

Each spacing element 480a or 480b is preferably formed of lightweight, rigid metallic material, such as cast aluminum, titanium or steel. Preferably, each spacing element 480a and 480b is formed as a one-piece, unitary member. Of course spacing elements 480a and 480b could be constructed of other materials or of several parts as needed and/or desired. U-shaped member 475 is preferably formed as a one-piece, unitary member of plastic material to reduce the weight of spacer 426. Moreover, U-shaped member 475 can be constructed of colored plastic material so that spacer 426 can be easily identified.

Spacing elements 480a and 480b are preferably snap-fitted with U-shaped member 475 in a conventional manner. More specifically, U-shaped member 475 preferably has a detent 486 formed in each axial side of free ends 473 and spacing elements 480a and 480b have mating projections 488 to fixedly couple spacing elements 480a and 480b to axially opposite sides of U-shaped member 475. Accordingly, release portion 474 is preferably axially centered relative to spacing portion 472. Of course, other methods could be used to connect spacing elements 480a and 480b to U-shaped member 475 as needed and/or desired.

When spacer 426 is assembled, elongated slot 476 is basically formed by a pair of sidewalls 478 spaced from each other, a first semicircular end wall 479a connecting side walls 478 and a second semicircular end wall 479b also connecting sidewalls 478 together. Slot 476 is sized and configured to receive first portion 30 of hub axle 20 therein. Spacer 426 can not be completely removed from first portion 30 without removing first portion 30 from hub body 22 due to release portion 474. Accordingly, spacer 426 will not be easily lost. Additionally, spacer 426 is lighter than spacer 26 of the first embodiment because plastic is used for part of spacer 426.

Fifth Embodiment

Figure 19:
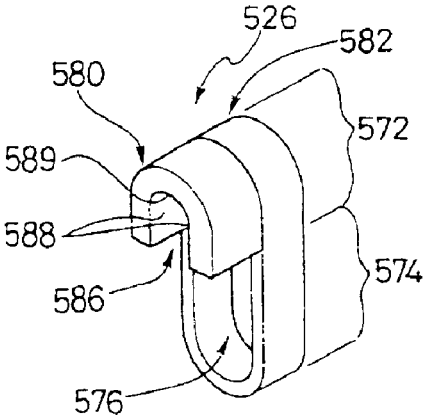
FIG. 19 is a perspective view of a modified spacer in accordance with a fifth embodiment of the present invention.
Figure 20:
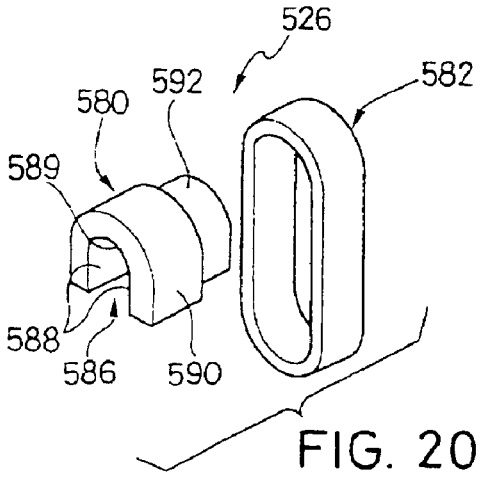
FIG. 20 is an exploded, perspective view of the modified spacer illustrated in FIG. 19.

Referring to FIGS. 19–20, a spacer 526 is illustrated in accordance with a fifth embodiment of the present invention. This fifth embodiment is identical to the first embodiment except spacer 26 of the first embodiment has been modified in this fifth embodiment. Specifically, spacer 526 of this fifth embodiment is formed of multiple pieces frictionally retained together. Descriptions of rear hub 18 of the first embodiment also apply to this fifth embodiment except as modified below. Moreover, spacer 526 is sized and configured to be used with rear hub 18 of the first embodiment. Accordingly, this fifth embodiment will not be discussed or illustrated in detail below.

Spacer 526 basically includes a spacing portion 572 and a release portion 574 extending from spacing portion 572 similar to the first embodiment. An elongated slot 576 is formed by release portion 574 and spacing portion 572. Slot 576 has a stepped configuration. Spacer 526 is basically formed by a spacing element 580 and a tubular element 582 frictionally retained on spacing element 580. Spacing element 580 is preferably formed of lightweight, rigid metallic material, such as cast aluminum, titanium or steel. Preferably, spacing element 580 is formed as a one-piece, unitary member. Of course, spacing element 580 could be constructed of other materials or of several parts as needed and/or desired. Tubular element 582 is preferably an oblong ring member formed of plastic material. Tubular member 582 can be formed of colored plastic material so that spacer 526 can be easily identified. Of course, tubular member 582 could be used with other spacers or spacing elements as needed and/or desired.

Spacing element 580 is a U-shaped member with an open-ended slot 586. Spacing element 580 and a part of tubular element 582 form spacing portion 572. The portion of tubular member 582 extending from spacing element 580 forms release portion 574. Open-ended slot 586 is formed with pair of sidewalls 588 spaced from each other and a semicircular end wall 589 connecting sidewalls 588. Slot 586 is sized and configured to receive first portion 30 of hub axle 20 therein (i.e., similar to slots 276 and 376 of the second and third embodiments. Spacing element 580 has a stepped external configuration formed of a first enlarged section 590 and a second reduced section 592. Preferably, second section 592 has a smaller cross-section and is sized and configured to have tubular member 582 frictionally retained thereon. Spacer 526 can not be completely removed from first portion 30 without removing first portion 30 from hub body 22 due to release portion 574. Accordingly, spacer 526 will not be easily lost. Additionally spacer 526 is lighter than spacer 26 of the first embodiment because plastic is used.

The terms of degree such as "substantially", "about" and "approximately" as used herein mean a reasonable amount of deviation of the modified term such that the end result is not significantly changed. These terms should be construed as including a deviation of ±5% of the modified term if this would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle hub comprising:

a hub axle having a first portion and a second portion releasably coupled to said first portion;

a hub body having an outer tubular portion and an interior passageway with said first portion of said hub axle being rotatably supported therein;

a sprocket support member releasably and non-rotatably coupled to said outer tubular portion of said hub body, said sprocket support member being mounted on said second portion of said hub axle; and a spacer supported on said first portion of said hub axle adjacent a free end of said hub body, said spacer having a spacing portion and *a release portion extending from said spacing portion with said spacer* being configured to move in a transverse direction relative to said hub axle between a first position in which said spacing portion is located [adjacent] *at least partially surrounding* said hub axle *to prevent axial movement of said hub body* and a second position in which said spacing portion is spaced from said hub axle without removing said first portion of said hub axle from said hub body,

*said release portion being configured to be spaced from said hub axle when said spacer is in said first position and said release portion being configured to be located at least partially surrounding said hub axle to allow axial movement of said hub body when said spacer is in said second position.*

2. [The] *A* bicycle hub [according to claim 1, wherein] *comprising:*

*a hub axle having a first portion and a second portion releasably coupled to said first portion:*

*a hub body having an outer tubular portion and an interior passageway with said first portion of said hub axle being rotatably supported therein;*

*a sprocket support member releasably and non-rotatably coupled to said outer tubular portion of said hub body, said sprocket support member being mounted on said second portion of said hub axle; and*

*a spacer supported on said first portion of said hub axle adjacent a free end of said hub body, said spacer having a spacing portion and being configured to move in a transverse direction relative to said hub axle between a first position in which said spacing portion is located adjacent said hub axle and a second position in which said spacing portion is spaced from said hub axle without removing said first portion of said hub axle from said hub body,* said spacer [includes] *including* a release portion extending from said spacing portion, said spacing portion having an axial length larger than said release portion.

3. The bicycle hub according to claim 2, wherein said spacing portion and said release portion form an elongated slot with said first portion of said hub axle located therein, said slot being closed to allow movement of said spacer between said first and second positions without falling off said hub axle.

4. The bicycle hub according to claim 3, wherein said axial length of said spacing portion is at least about twice as large as said axial length of said release portion such that an axial space is provided between said spacer and a portion of a bicycle frame when said spacer is in said second position.

5. The bicycle hub according to claim 4, wherein said outer tubular member is non-rotatably and releasably coupled to said sprocket support member via an engagement section with an axial length smaller than said axial space.

6. The bicycle hub according to claim 3, wherein said release portion is axially arranged on one side of said spacing portion.

7. The bicycle hub according to claim 3, wherein said spacer is formed as a one-piece, unitary member.

8. The bicycle hub according to claim 7, wherein said spacer is formed of metal.

9. The bicycle hub according to claim 3, wherein said release portion is axially centered relative to said spacing portion.

10. The bicycle hub according to claim 3, wherein said release portion is formed of a cable loop fixedly coupled to said spacing portion.

11. The bicycle hub according to claim 10, wherein said spacer is formed of metal.

12. The bicycle hub according to claim 3, wherein said release portion includes a U-shaped member with its free ends forming a part of said spacing portion, and said spacing portion further includes a pair of spacing elements fixedly coupled to said free ends of said U-shaped member.

13. The bicycle hub according to claim 12, wherein said spacing elements at least partially contact each other.

14. The bicycle hub according to claim 12, wherein said U-shaped member is formed of plastic and said spacing elements are formed of metal.

15. The bicycle hub according to claim 3, wherein said spacer includes tubular element forming said elongated slot and a spacing element coupled to said tubular element, said spacing element and a part of said tubular element forming said spacing portion.

16. The bicycle hub according to claim 15, wherein said spacing element has an open ended slot, a first enlarged section and a second reduced section frictionally retained in said tubular element such that said open ended slot forms part of said elongated slot.

17. The bicycle hub according to claim 16, wherein said tubular element is formed of plastic and said spacing element is formed of metal.

18. The bicycle hub according to claim 1, wherein said spacing portion includes an open ended slot formed therein.

19. [The] *A* bicycle hub [according to claim 18, wherein] *comprising:*

*a hub axle having a first portion and a second portion releasably coupled to said first portion;*

*a hub body having an outer tubular portion and an interior passageway with said first portion of said hub axle being rotatably supported therein;*

*a sprocket support member releasably and non-rotatably coupled to said outer tubular portion of said hub body, said sprocket support member being mounted on said second portion of said hub axle; and*

*a spacer supported on said first portion of said hub axle adjacent a free end of said hub body, said spacer having a spacing portion and being configured to move in a transverse direction relative to said hub axle between a first position in which said spacing portion is located adjacent said hub axle and a second position in which said spacing portion is spaced from said hub axle without removing said first portion of said hub axle from said hub body,*

*said spacing portion including an open ended slot formed therein and* said spacing portion [is] *being* formed as a one-piece, unitary member.

20. [The] *A* bicycle hub [according to claim 18, wherein] *comprising:*

*a hub axle having a first portion and a second portion releasably coupled to said first portion;*

*a hub body having an outer tubular portion and an interior passageway with said first portion of said hub axle being rotatably supported therein;*

*a sprocket support member releasably and non-rotatably coupled to said outer tubular portion of said hub body, said sprocket support member being mounted on said second portion of said hub axle; and*

*a spacer supported on said first portion of said hub axle adjacent a free end of said hub body, said spacer*

*having a spacing portion and being configured to move in a transverse direction relative to said hub axle between a first position in which said spacing portion is located adjacent said hub axle and a second position in which said spacing portion is spaced from said hub axle without removing said first portion of said hub axle from said hub body,*

*said spacing portion including an open ended slot formed therein and* said spacer [includes] *including* a cable loop fixedly coupled to said spacing portion.

21. [The] *A* bicycle hub [according to claim 18, wherein] *comprising:*

*a hub axle having a first portion and a second portion releasably coupled to said first portion;*

*a hub body having an outer tubular portion and an interior passageway with said first portion of said hub axle being rotatably supported therein;*

*a sprocket support member releasably and non-rotatably coupled to said outer tubular portion of said hub body, said sprocket support member being mounted on said second portion of said hub axle; and*

*a spacer supported on said first portion of said hub axle adjacent a free end of said hub body, said spacer having a spacing portion and being configured to move in a transverse direction relative to said hub axle between a first position in which said spacing portion is located adjacent said hub axle and a second position in which said spacing portion is spaced from said hub axle without removing said first portion of said hub axle from said hub body,* said spacing portion [includes] *including an open ended slot formed therein and* a tubular element frictionally retained thereon, a part of said tubular element forming part of said spacing portion and another part of said tubular element forming a release portion closing said open ended slot.

22. [The] *A* bicycle hub [according to claim 18, wherein] *comprising:*

*a hub axle having a first portion and a second portion releasably coupled to said first portion;*

*a hub body having an outer tubular portion and an interior passageway with said first portion of said hub axle being rotatably supported therein;*

*a sprocket support member releasably and non-rotatably coupled to said outer tubular portion of said hub body, said sprocket support member being mounted on said second portion of said hub axle; and*

*a spacer supported on said first portion of said hub axle adjacent a free end of said hub body, said spacer having a spacing portion and being configured to move in a transverse direction relative to said hub axle between a first position in which said spacing portion is located adjacent said hub axle and a second position in which said spacing portion is spaced from said hub axle without removing said first portion of said hub axle from said hub body,*

*said spacing portion including an open ended slot formed therein and* said spacing portion [includes] *including* a pair of spacing elements.

23. The bicycle hub according to claim 1, wherein said outer tubular portion of said hub body includes an engagement member non-rotatably coupled thereto.

24. The bicycle hub according to claim 23, wherein said engagement member is releasably and non-rotatably coupled to said sprocket support member.

25. The bicycle hub according to claim 23, wherein said hub body includes a tubular inner sleeve portion with said first portion of said hub axle rotatably arranged therein.

26. The bicycle hub according to claim 25, wherein said inner sleeve portion is releasably and non-rotatably coupled to said second portion of said hub axle.

27. The bicycle hub according to claim 1, wherein said first portion of said hub axle includes a quick release mechanism mounted on a free end of said first portion.

28. The bicycle hub according to claim 1, wherein said sprocket support member includes a freewheel.

29. The bicycle hub according to claim 1, wherein said first portion of said hub axle is threadedly coupled to said second portion of said hub axle.

* * * * *